Jan. 31, 1956     H. C. N. McGEE     2,732,653
LIVE-BAIT CONTAINER
Filed June 10, 1952

INVENTOR.
Hugh C. N. McGee
BY
Wood, Herron & Evans.
ATTORNEYS.

United States Patent Office 2,732,653
Patented Jan. 31, 1956

2,732,653

LIVE-BAIT CONTAINER

Hugh C. N. McGee, Dry Ridge, Ky.

Application June 10, 1952, Serial No. 292,690

1 Claim. (Cl. 43—55)

This invention concerns bait containers of the type which are designed for carrying live bait such as frogs, crickets or grasshoppers.

Such bait, by its very nature, is rather difficult to control or handle in an ordinary bait box, that is, one having a hinged lid, because of the likelihood of the bait escaping when the lid is opened. In order to overcome this difficulty, it has been proposed that the hinged lid of the ordinary bait box be replaced by an elastic diaphragm closure having an elongated slit in it through which bait may be placed into and removed from the box. This expedient is very successful as far as preventing the accidental escape of bait, but it makes the selection of a particular piece of bait rather difficult inasmuch as such selection must be made by feel. Further, it is found that the live bait, upon being disturbed, jumps or hops or migrates upwardly in the box and tends to collect in the corners adjacent the closure where it is somewhat difficult to secure a particular bait wtihout injuring it and others near it.

It is the primary object of the invention to provide a live-bait container construction incorporating a slit elastic diaphragm in a novel manner which obviates these difficulties and which has other advantages and features not provided in live bait containers heretofore.

In its simplest form, the container comprises a perforate or translucent hemispherical shell having a floor of thin elastic material which is slit to provide access into the enclosure. The advantages of the slit diaphragm closure are thus retained. However, the hemispherical shell, which preferably is made of woven wire or translucent plastic, can be seen through. All of the bait inside of the container is thus in plain view and upon reaching into the container from the bottom, a particular selection can be made without difficulty. Further, since live bait tends to move up and away from the floor of the container upon being disturbed, it is more readily accessible than in past construction inasmuch as in the hemispherical shell there are no corners in which the bait can collect and make selection difficult.

It is a further object of the invention to provide a live-bait container construction of the type described which is exceedingly economical to manufacture. As stated, it is contemplated that the hemispherical shell be made of woven wire or of transparent plastic. Neither type of construction is particularly expensive. The closure preferably comprises a circular diaphragm made of rubber or other elastic material having a marginal bead. This bead is designed to engage over the lower rim of the hemispherical shell. The rim of the shell may also be beaded or otherwise configurated to securely seat the marginal bead of the diaphragm. The diaphragm itself being simple in design, is also inexpensive to manufacture. The assembly of the two, the shell and the diaphragm, is simply a matter of stretching the diaphragm over the bottom of the shell.

Other objects and advantages of the invention will be readily apparent from the following description of the drawings in which.

Figure 1:
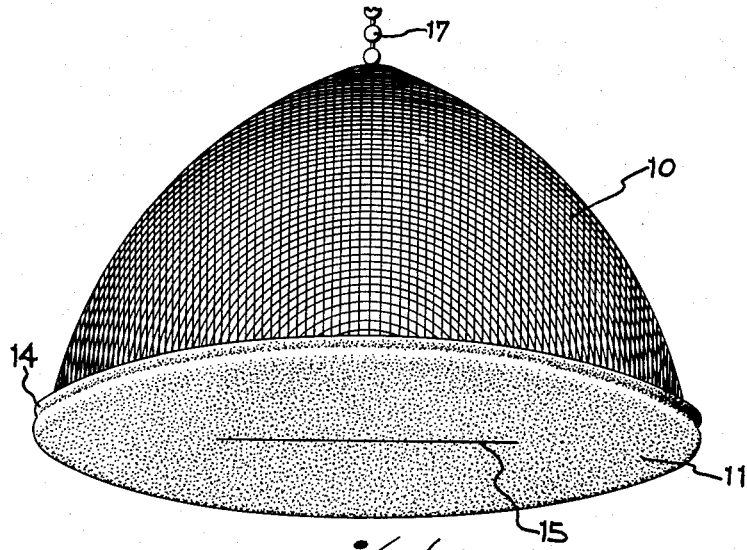
Figure 1 is a perspective view of a bait container incorporating the principles of the present invention.
Figure 2:
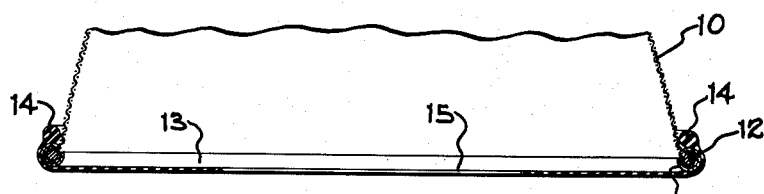
Figure 2 is a fragmentary cross sectional view of the lower portion of the container shown in Figure 1.
Figure 3:
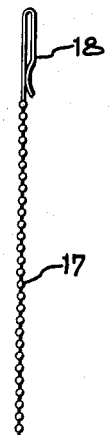
Figure 3 is a perspective view of the container illustrating the manner in which bait is grasped by reaching up through the slit in the diaphragm which comprises the floor of the container.
Figure 3:
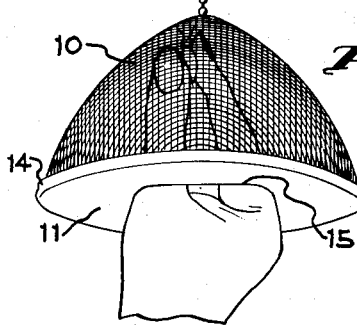

The container itself comprises only two parts, a hemispherical shell 10 and a diaphragm type closure 11. The shell of Figure 1 is made of woven wire resembling an ordinary household strainer or colander, except that in the present instance what would be the upper end of such strainer is at the bottom and is closed by diaphragm 11, such diaphragm forming a floor for the bait container. Like an ordinary strainer, the marginal rim of the shell includes a beading comprising a ring of wire 12 about which the margin of the wire mesh is turned, being clamped thereon by a metal bead member 13. The wire and bead member provide a seat for a marginal bead 14 formed on the edge of the diaphragm as shown in Figure 2. This construction is preferred inasmuch as no extra fastening means are required in order to secure the floor to the container. Further, the diaphragm may be removed and replaced easily in order to clean the container after use.

The diaphragm 11 is slit as at 15 in the central area to provide access into the container. The slit shown is made sufficiently long to permit a person to insert his fingers, it being unnecessary in a container of the general size and type illustrated in the drawings to insert the hand. Of course, in a larger container the slit may be made sufficiently long to accommodate the whole hand.

Figure 4:
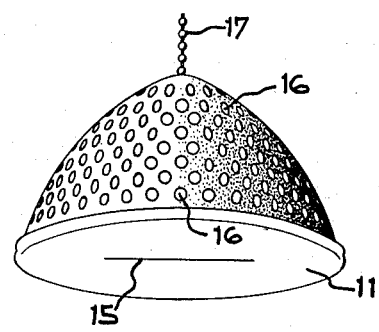
Figure 4 is a perspective view, similar to Figure 1, illustrating a modified form of the invention.

In the modification of Figure 4, the hemispherical shell portion of the container is made out of molded plastic material in which a plurality of holes 16 is formed to provide ventilation. The lower rim of the plastic shell preferably is beaded to provide a seat for the diaphragm like in the wire mesh shell described above. If desired, the plastic may be tinted. However, it is suggested that such tinting should not be so heavy as to make it difficult to see into the container. In any event, translucent plastic material should be used.

Although not necessary, it is preferred that a ball type chain such as the one shown at 17 be employed for securing a belt clip 18 to the top of the container. The container can thus be hung from the angler's belt or from a shirt pocket. The bottom of the ball chain may be fastened to the top of the wire mesh shell container by solder or a small loop of wire provided for fastening the two together. In the plastic shell construction a small hook or loop of wire may be employed. The ball chain shown permits the container to turn freely and thus avoids entanglement. It should be sufficiently long to permit the container to be brought up into a position in which a proper selection of bait can be made without difficulty.

The wire mesh of the shell 10 and the perforations 16 of the plastic shell provide more than adequate ventilation to keep bait in lively condition. It has been found that by keeping a few moist leaves of lettuce or a small amount of moist moss in the container along with the live bait that such bait remains in good condition for a number of weeks.

Having described my invention I claim:

An angler's live-bait container comprising a dome-shaped, rigid, foraminous shell having a multiplicity of apertures therein such that live bait within said container may be viewed through said shell from above, means secured to the top center of said dome-shaped shell for suspending said container from an article of an angler's clothing with the mouth of the shell disposed downwardly, the mouth of said shell being circular, a thin-walled, circular diaphragm which is made of rubber, and means fastening said diaphragm in stretched condition over the mouth of said shell to constitute a floor for said container, said diaphragm having a slit therein to provide access into the container, said slit being substantially shorter than the diameter of the diaphragm and being disposed beneath the top center of the dome-like shell where live bait within the container tend to collect upon being disturbed by an angler reaching his fingers into the container through the slit in said floor to capture a selected bait.

References Cited in the file of this patent

UNITED STATES PATENTS

| | | |
|---|---|---|
| 296,002 | Harley | Apr. 1, 1884 |
| 433,574 | Lawton | Aug. 5, 1890 |
| 594,448 | Webber | Nov. 30, 1897 |
| 1,201,082 | Nussbaumer | Oct. 10, 1916 |
| 1,745,012 | Gilmore | Jan. 28, 1930 |
| 2,081,671 | Lauer | May 25, 1937 |
| 2,219,983 | Evenson | Oct. 29, 1940 |
| 2,241,314 | Mohler | May 6, 1941 |
| 2,597,002 | Johnson et al. | May 20, 1952 |
| 2,620,588 | Critser | Dec. 9, 1952 |